United States Patent
Cruz Dominguez et al.

(10) Patent No.: US 9,216,810 B2
(45) Date of Patent: Dec. 22, 2015

(54) HIGHLY LOADED FRAME OF AN AIRCRAFT FUSELAGE WITH A LATTICE STRUCTURED WEB

(71) Applicant: AIRBUS OPERATIONS S.L., Getafe (ES)

(72) Inventors: Francisco Jose Cruz Dominguez, Getafe (ES); Elena Arevalo Rodriguez, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 165 days.

(21) Appl. No.: 13/688,738

(22) Filed: Nov. 29, 2012

(65) Prior Publication Data
US 2013/0140401 A1  Jun. 6, 2013

(30) Foreign Application Priority Data
Dec. 1, 2011 (EP) ..................................... 11382372

(51) Int. Cl.
*B64C 1/00* (2006.01)
*B64C 1/26* (2006.01)
*B64C 1/06* (2006.01)

(52) U.S. Cl.
CPC .. *B64C 1/26* (2013.01); *B64C 1/061* (2013.01)

(58) Field of Classification Search
CPC .. B64C 1/061; B64C 1/12; B64C 2001/0072; B64C 1/26; B64C 1/064; Y02T 50/433; Y02T 50/672
USPC ......................................... 244/119, 131, 133
See application file for complete search history.

(56) References Cited

U.S. PATENT DOCUMENTS

| 3,551,237 | A | * | 12/1970 | Cox et al. ....................... 156/175 |
| 6,213,426 | B1 | * | 4/2001 | Weber et al. ............... 244/117 R |
| 7,344,108 | B2 | * | 3/2008 | Muylaert et al. ............... 244/115 |
| 8,387,917 | B1 | * | 3/2013 | Grip et al. ...................... 244/119 |
| 8,678,314 | B2 | * | 3/2014 | Martino Gonzalez et al. ............................ 244/121 |
| 2008/0164375 | A1 | * | 7/2008 | Garcia Laja et al. ......... 244/131 |
| 2008/0272236 | A1 | * | 11/2008 | Rawdon et al. ............ 244/118.1 |
| 2009/0001218 | A1 | * | 1/2009 | Munoz Lopez et al. ...... 244/124 |

(Continued)

FOREIGN PATENT DOCUMENTS

| DE | 10 2005 003 296 A1 | 7/2006 |
| FR | 2 927 686 A1 | 8/2009 |
| GB | 392905 A | 5/1933 |

OTHER PUBLICATIONS

Extended European Search Report issued May 18, 2012 in Patent Application No. 11382372.8.

*Primary Examiner* — Rob Swiatek
*Assistant Examiner* — George Andonyan
(74) *Attorney, Agent, or Firm* — Oblon, McClelland, Maier & Neustadt, L.L.P.

(57) ABSTRACT

A frame of a fuselage section of an aircraft that receives external loads, such as the rear section that receives the loads of the tail planes, comprising a first sector configured specifically to withstand these external loads and a second sector along the remaining perimeter of the fuselage, said first sector comprising the following structural elements a) a foot piece to be joined to the fuselage skin; b) a head piece; c) a web comprising one or more fitting-pieces for receiving said external loads and a plurality of X-shaped pieces joined by its ends to said foot piece and said head piece; and d) two connecting pieces of the ends of said foot piece and said head piece with the second sector of the frame.

12 Claims, 7 Drawing Sheets

(56) References Cited

U.S. PATENT DOCUMENTS

| | | | |
|---|---|---|---|
| 2010/0044510 A1* | 2/2010 | Schroeer et al. | 244/119 |
| 2010/0133382 A1* | 6/2010 | Pahl | 244/120 |
| 2010/0155532 A1* | 6/2010 | Ariza Martin et al. | 244/119 |
| 2010/0320331 A1 | 12/2010 | Vallee | |
| 2011/0168836 A1* | 7/2011 | Sanz Martinez et al. | 244/54 |
| 2013/0075529 A1* | 3/2013 | Marcoe | 244/131 |

\* cited by examiner

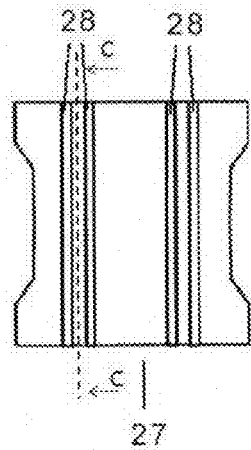  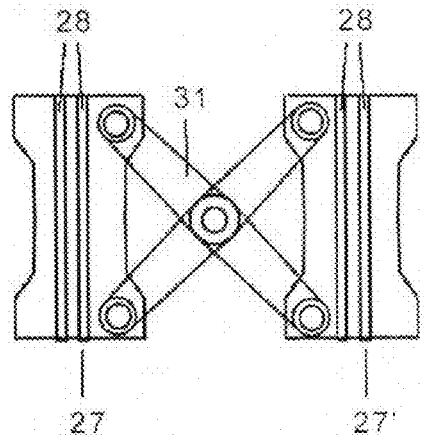
FIG. 4a    FIG. 4b    FIG. 5
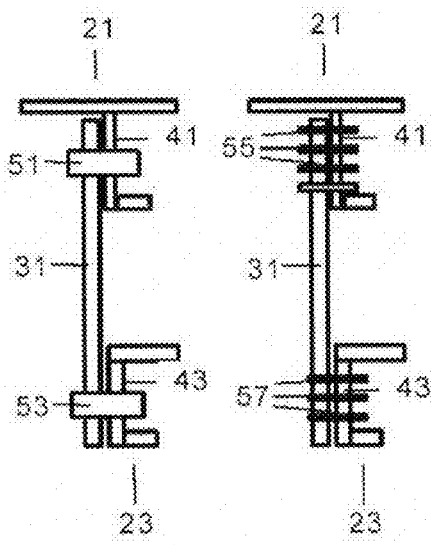 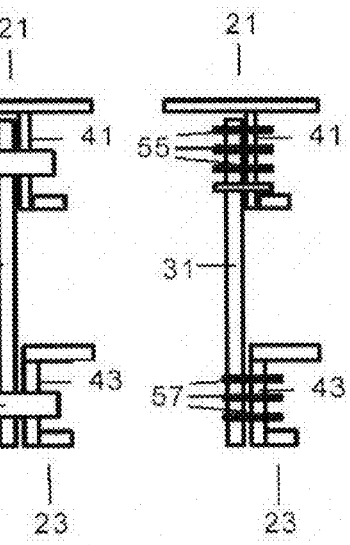 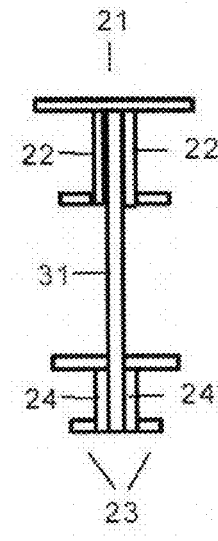 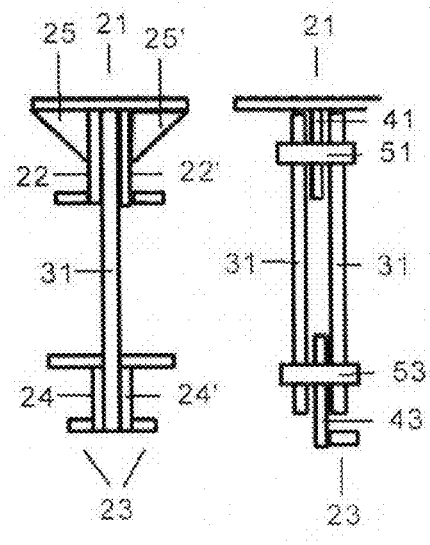 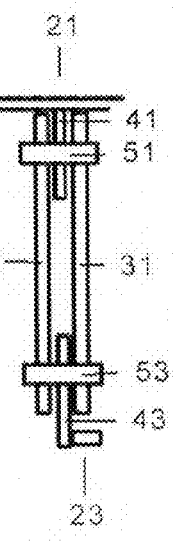
FIG. 6a    FIG. 6b    FIG. 6c    FIG. 6d    FIG. 6e

HIGHLY LOADED FRAME OF AN AIRCRAFT FUSELAGE WITH A LATTICE STRUCTURED WEB

FIELD OF THE INVENTION

The present invention relates to highly loaded frames of aircraft fuselages and, more particularly, to the frames which receive the loads of the vertical tail plane.

BACKGROUND OF THE INVENTION

The load frames are structural elements within an aircraft fuselage that are characterized by the fact that they support and transfer specific local loads from other structural components such as the vertical tail plane, the horizontal tail plane and the wing. In addition they, of course, comply with the aircraft fuselage shaping and stiffening standard requirements.

Traditionally, load frames were made of metallic materials with different sections, the most common being I and J sections that, through machining processes, are provided with a network of nerves that stabilize the web of the frame.

Despite the tendency to extend the use of composite materials for most of the components of an aircraft due to the weight savings that this material entails with respect to metallic materials, in certain components, such as load frames, it is very difficult, due to their complexity, to achieve a composite material design that can compete both in weight and cost with current metallic designs.

The manufacturing of load frames with composite materials with a similar shape to metallic designs is possible but, apart from the cost resulting from the complexity of their design, it has, among others, the disadvantage that it is very difficult to get optimized laminates for supporting the required loads with these designs, which means not being competitive in weight.

In the case of load frames it is very difficult to compete with the machined metal frames because, due to the high and different loads they shall support, the alternative composite material frames often pose various manufacturing problems due to their rather complex design, with big section changes and areas where all kinds of fabric orientations in the laminate are needed.

Some proposals in this respect are known such as those disclosed in patent applications WO 2008/092970, U.S. 2009/0026315, WO 2009/030731 and EP 2 343 237, but the aeronautic industry continues to demand load frames of composite materials that can compete successfully with metal frames.

The present invention is directed to the attention of that demand.

SUMMARY OF THE INVENTION

It is an object of the present invention to provide a load frame for aircraft fuselages that can be made entirely from composite materials or other materials and that can be competitive in cost and weight with traditional metallic frames.

This and other objects are achieved by a frame of a fuselage section of an aircraft that receives external loads comprising a first sector configured specifically to withstand these external loads and a second sector along the remaining perimeter of the fuselage, where the first sector comprises the following structural elements: a) a foot piece to be joined to the fuselage skin; b) a head piece, c) a web comprising one or more fitting-pieces for receiving said external loads and a plurality of X-shaped pieces joined by their ends to said foot piece and said head piece, d) two connecting pieces of the ends of said foot piece and said head piece with the second sector of the frame.

Therefore, these structural elements have features that allow, on the one hand, making each of them with appropriate materials for their individual functionalities and, on the other hand, different levels of integration of the manufacturing process, including a fully integrated manufacturing process.

In one embodiment of the invention, the web of the first sector of the frame may further comprise radial struts attached to the foot piece and to the head piece. Two structural elements for the web of the frame are therefore available.

The X-shaped pieces can be made of two equal rods joined by their center or of unitary pieces with, particularly, a double T-shaped cross section.

In one embodiment of the invention, all structural elements are made of composite material. Different types of composite materials and manufacturing processes/technologies can be used for the different structural elements, allowing an optimization in weight and cost.

In one embodiment of the invention, the X-shaped pieces and, if present, the additional struts, are joined to the foot piece and to the head piece by a chemical bond. Thus, in this embodiment the various pieces are made separately and joined using techniques such as co-bonding or co-injection.

In on embodiment of the invention where the structural elements of the first sector of the frame are manufactured separately and then bonded chemically, the head piece is formed by two C-shaped sub-pieces whose webs are attached to said X-shaped pieces and the foot piece has a it shape, with said X-shaped pieces being joined to its webs. The foot piece of this frame may further comprise transverse stiffeners of its webs.

In one embodiment of the invention, the X-shaped pieces and, if present, the additional struts, are joined to the foot piece and to the head piece by a mechanical joint. Thus, in this embodiment the various pieces are made separately and joined by one or more fasteners such as, for example, rivets or bolts, for which purpose, such X-shaped pieces and, if present, the additional struts are preferably configured with a lug at each end to facilitate the joint.

In on embodiment of the invention where the structural elements of the first sector of the frame are manufactured separately and then mechanically joined, the X-shaped pieces are attached to the web of the T-shaped foot piece with stiffened webs and to the web of the C-shaped head piece.

In on embodiment of the invention where the structural elements of the first sector of the frame are manufactured separately and then mechanically joined, the foot piece is T-shaped, the head piece is L-shaped and the X-shaped pieces are arranged in two sets at both sides of the webs of the foot piece and the head piece.

The frame object of the invention is, preferably, a frame located on the rear fuselage of the aircraft that receives the loads from the vertical tail plane.

Other characteristics and advantages of the present invention will be clear from the following detailed description of embodiments illustrative of its object in relation to the attached figures.

DESCRIPTION OF THE FIGURES

FIGS. 4a and 4b are front and cross-section views of a first embodiment of the fitting-pieces included in the first sector of the load frame.

FIG. 5 is a front view of a second embodiment of the fitting-pieces, included in the first sector of the load frame.

FIGS. 6a, 6b, 6c, 6d, 6e are schematic cross sectional views of different configurations of the first sector of the load frame.

DETAILED DESCRIPTION OF THE INVENTION

Figure 1A:
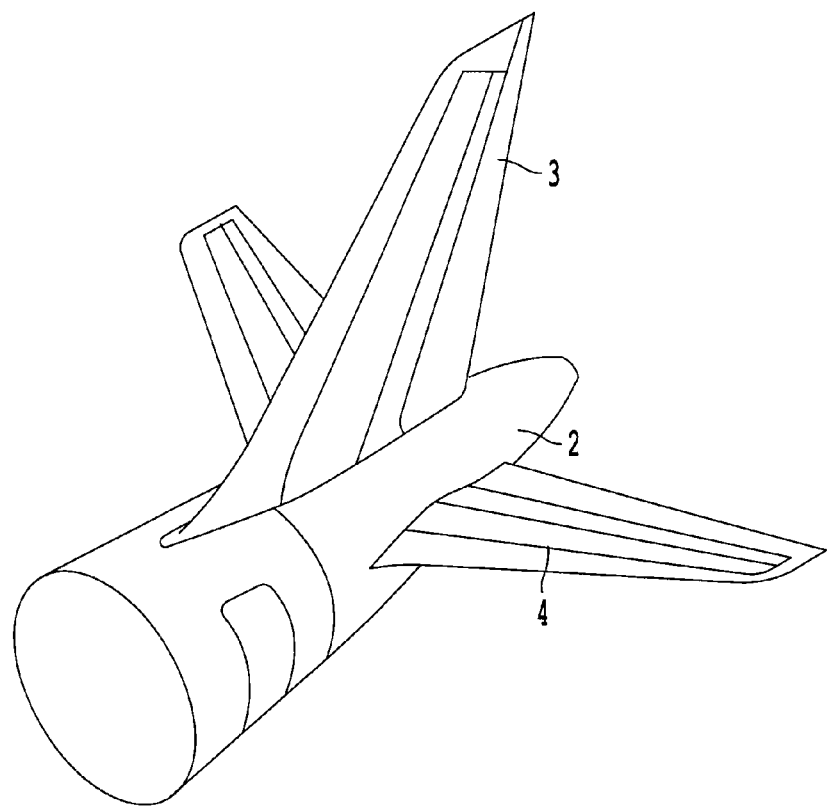
FIG. 1a is a perspective view of the rear section of an aircraft where the load frames that withstand the loads induced by the vertical tail plane and the horizontal tail plane are located.
Figure 1B:
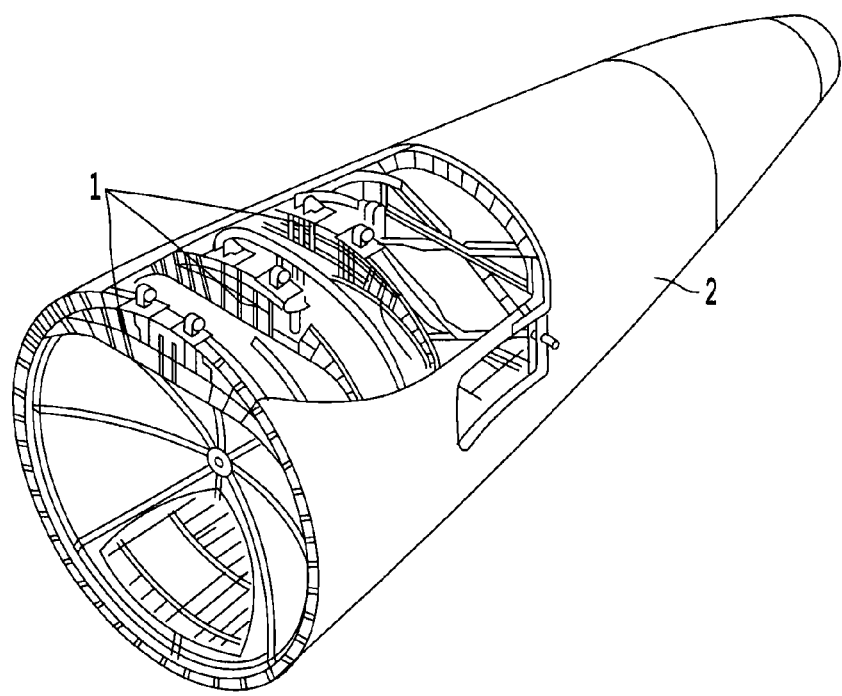
FIG. 1b is a perspective view of the fuselage in said rear section showing metal load frames known in the art and FIG. 1c is a front view of the upper section of one of them.
Figure 1C:
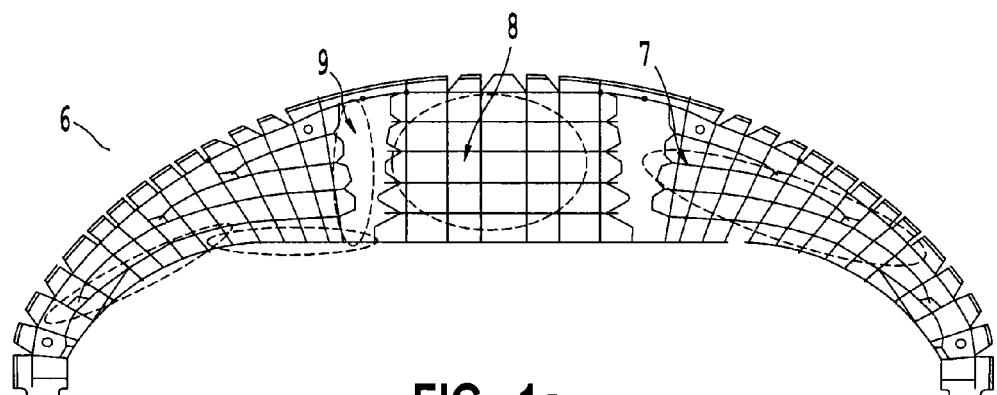

The load frames object of the present invention are frames located in areas of the fuselage that receive large external local loads from other components of the aircraft structure such as the metal frames 1 located at the rear section 2 of and aircraft fuselage (see FIGS. 1c, 1b and 1c) where the loads from the vertical tail plane 3 and the horizontal tail plane 4 shall be supported.

These metal frames 1, well known in the aeronautic industry, comprise a first sector 6 with load receiving zones 9 and a web with zones 7, 8 stiffened with nerves in two directions.

To be fully competitive with metallic frames, the sector of the load frame that receives external local loads (in the rest of the frame there are no substantial differences between load frames and shape frames) is structured by a set of parts made of composite material, to facilitate, on the one hand, the optimization of the laminates and to allow, on the other hand, the weight optimization.

Each of these parts must meet different structural requirements which facilitate their individual optimization in weight and cost. In this regard, it should be noted that within this sector of the frame, such requirements vary along its perimeter involving, in principle, changes in the cross section and thickness variations of the laminates which can be attended to in a more optimized way if they are addressed individually for each of these parts instead of at a global level.

Figure 2A:
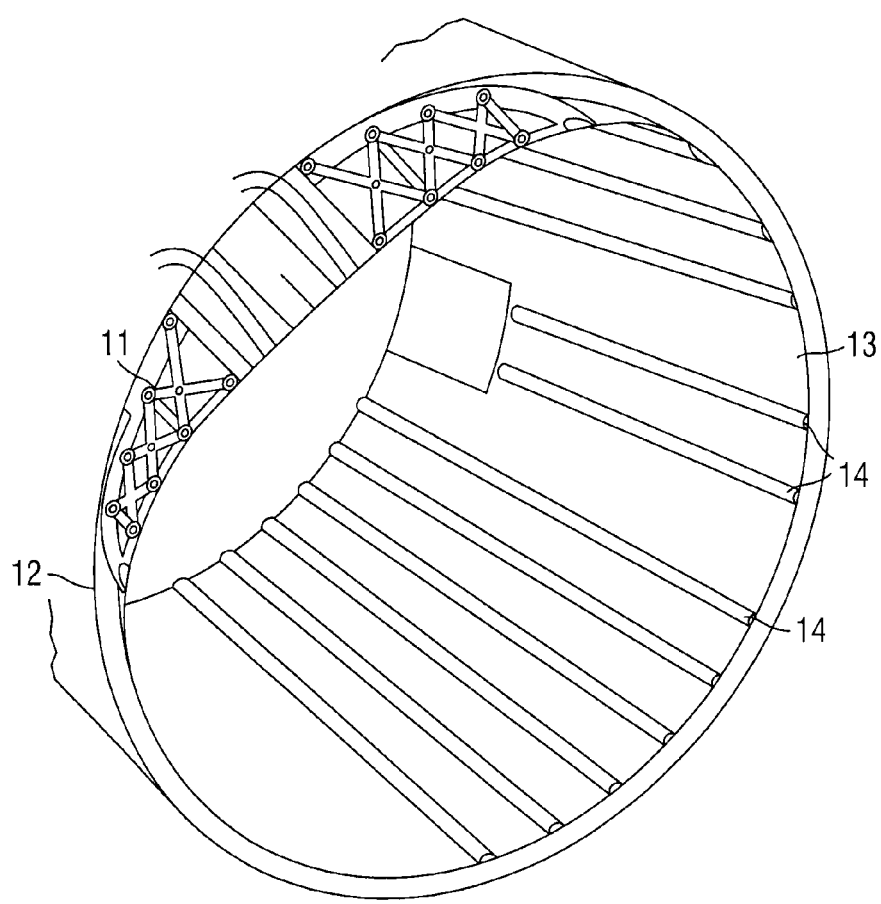
FIG. 2a is a schematic perspective view showing the first sector of a load frame according to an embodiment of the present invention in an aircraft fuselage and FIG. 2b is an enlarged front view of said sector.
Figure 2B:
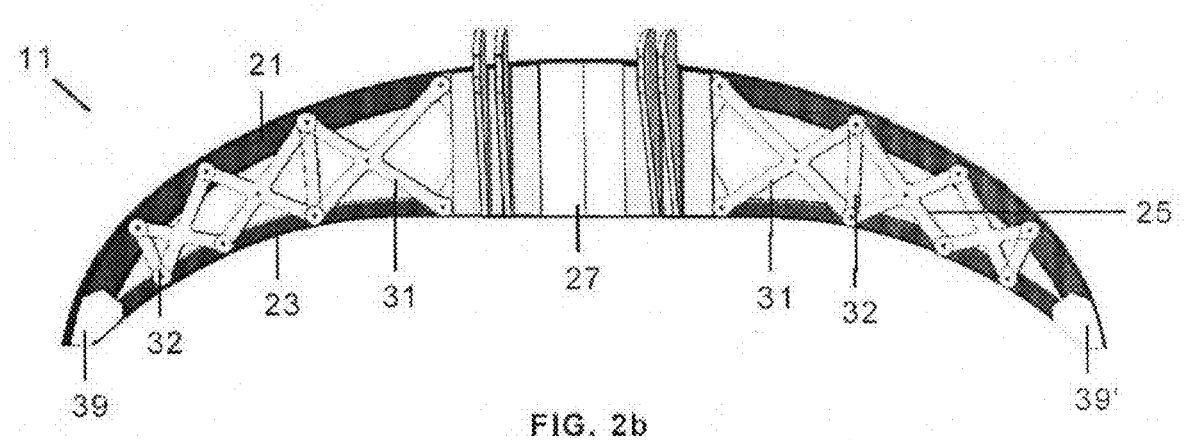

FIGS. 2a and 2b show a first sector 11 of a load frame that receives external local loads. The rest of frame, corresponding to a second sector 12, which is conventional, is schematically illustrated. The load frame according to this invention is arranged transversely to the fuselage skin 13, stiffened by stringers 14.

In said sector 11, the load frame comprise:
A foot piece 21 to be joined to the fuselage skin 13, leaving space for the stringers 14, that is compatible with the rest of the frame, at sector 12, facilitating the change in cross-section, thus involving a cost saving and a weight optimization.
A web piece 25 comprising a fitting-piece 27 in the load introduction zone, a plurality of X-shaped pieces 31 formed by two crossed elements to the effect that one of them works in compression and the other in tension and, optionally, radial struts 32.
A head piece 23 which serves to stabilize the web of the frame and facilitates the dissemination of the load received in the fitting piece 27.
Two connecting pieces 39, 39' between the ends of the foot and the head pieces 21, 23 and the rest of the frame favouring the corresponding load transfer.

The division of the sector 11 of the frame in the above-mentioned pieces allows the optimization of their corresponding laminates according to the loads to be supported by each one of them. In this way, sharing the load frame requirements between the different pieces in which the frame is structured allows achieving an easier manufacture and therefore a cost reduction.

With the above-mentioned structure, various manufacturing possibilities of the sector 11 of the frame are envisaged, from a separate manufacturing of each of the above pieces and their assembly by means of mechanical joints, to a manufacturing with higher levels of integration using, for example, co-curing and/or co-injecting processes. In this regard it should be understood that the meaning of the term "piece", as used in this invention, includes the meaning given in the technology of composite materials to the term "preform": an item that requires an individual laminating process to conform it with certain characteristics and that is intended to be integrated with other elements in the manufacturing process of the product to which it belongs.

Figure 3:
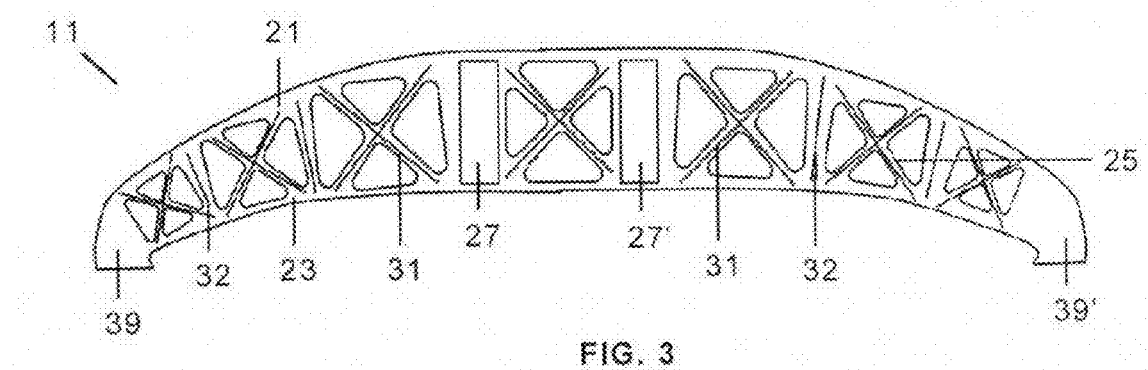
FIG. 3 is a front view of another embodiment of the first sector of the load frame manufactured with a high level of integration.

In the embodiment of the invention illustrated in FIG. 3, a sector 11 of a frame comprising the same items mentioned above made with a high level of integration is shown (idealized).

FIGS. 4a and 4b show the configuration of a flat unitary fitting-piece 27 which receives the external loads applied to the fittings 28 attached to it by the vertical tail plane, which corresponds to the embodiment illustrated in FIG. 2a, formed by a set of preforms with predominant orientations at +45 degrees where two pairs of fittings 28 are integrated and FIG. 5 shows a configuration of two fitting-pieces 27, 27' (each with two pairs of fittings 28, 28' to receive external loads) connected by an X-shaped piece 31 which corresponds to the embodiment illustrated in FIG. 3.

FIGS. 6c and 6d show two embodiments of the invention with different configurations of the foot piece 21, the head piece 23 and the X-shaped pieces 31 oriented toward a chemical bonding (i.e. a union achieved by techniques such as the co-curing, the co-bonding or the co-injection) between them.

The foot piece 21 has a π-shape and the head piece 23 is formed by two C-shaped sub-pieces. The ends of the X-shaped pieces 31 are attached, respectively, to the two webs 22, 22' of the foot piece 21 and to the two webs 24, 24' of the head piece 23.

In the case of FIG. 6d the foot piece 21 includes transverse stiffeners 25, 25'.

FIGS. 6a, 6b and 6e show three embodiments of the invention with different configurations of the foot piece 21, the head piece 23 and the X-shaped pieces 31 oriented toward a mechanical joint between them made with fasteners such as rivets.

In the case of FIGS. 6a and 6b the foot piece 21 has a T-shape with a stiffened web and the head piece 23 has a C-shape. The ends of the X-shaped pieces 31 are attached, respectively, to the web 41 of the foot piece 21 (by means of a joining element 51 in the case of FIG. 6a and several joining elements 55 in the case of FIG. 6b) and to the web 43 of the head piece 23 (by means of a joining element 51 in the case of FIG. 6a and by means of various joining elements 55 in the case of FIG. 6b).

In the case of FIG. 6e, the foot piece 21 has a T-shape and the head piece 23 has an L-shape The ends of the X-shaped pieces 31, arranged in two parallel sets, are joined, respectively, to the web 41 of the foot piece 21 and to the web 43 of the head piece 23 by means, respectively, of the joining elements 51, 53.

All configurations mentioned allow variations of the size and thickness of the above pieces along the perimeter of the sector 11 of the frame, thus enabling its optimization in weight and cost.

Figure 7A:
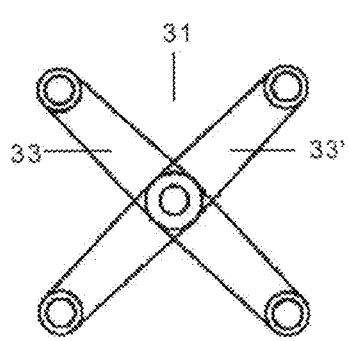
FIGS. 7a and 7b are front views of two embodiments of the X-shaped pieces used in the first sector of a load frame and FIG. 7c is a cross sectional view along plane A-A of FIGS. 7a and 7b.
Figure 7B:
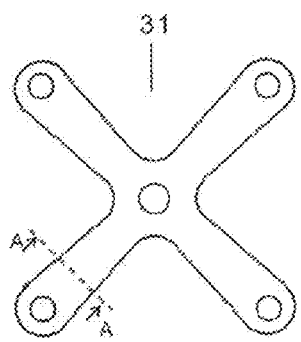
Figure 7C:
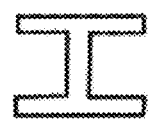

The X-shaped piece 31 may be formed by two independent rods 33, 33' joined in their central part by means of a rivet or a bolt, as shown in FIG. 7a, or by an integrated structure as shown in FIG. 7b. In a preferred embodiment the cross section of the arms of the X-shaped piece 31, which must be sized to meet the corresponding minimum values of inertia and stiffness depending on the load requirements, has a double T shape.

Figure 8A:
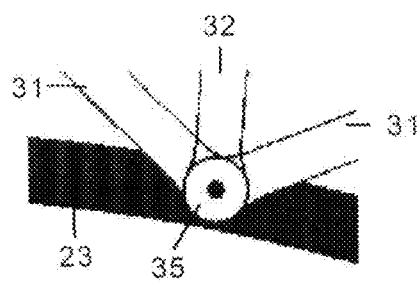
FIGS. 8a, 8b, 8c are schematic front views illustrating three embodiments of joints between the web piece and the foot piece of the first sector of the load frame.
Figure 8B:
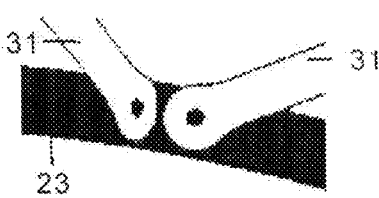
Figure 8C:
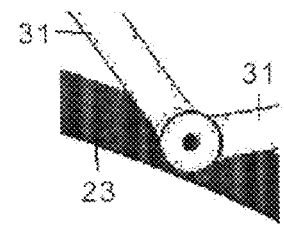

The ends of said X-shape pieces of X 31 and said struts 32 can be configured with lugs 35 to facilitate their joining to the head piece 23 as illustrated in FIGS. 8a, 8b and 8c and similarly to the foot piece 21.

Although the present invention is preferably focused to frames entirely made of a composite material, it also comprises frames in which the above-mentioned parts are made of metallic materials.

Although the present invention has been described in connection with various embodiments, it will be appreciated from the specification that various combinations of elements, variations or improvements therein may be made, and are within the scope of the invention.

The invention claimed is:

1. A frame located at a tail fuselage section of an aircraft that receives
   external loads, the frame comprising:
   a first arcuate sector of a load frame, the first sector extending along an upper portion of a perimeter of said fuselage section,
   wherein said first sector of the load frame spans transversely to a longitudinal axis of said aircraft and along a cross-section of said fuselage section, and
   wherein the first sector is joined to a skin of said fuselage section,
   the first sector being configured to withstand the external loads received by said fuselage section; and
   a second arcuate sector of the load frame, the second sector extending along the remaining portion of the perimeter of said fuselage section,
   wherein said first sector includes the following structural elements:
   a) an upper foot piece joined to the skin of said fuselage section;
   b) a lower head piece;
   c) a web including one or more fitting-pieces that receive said external loads and a plurality of X-shaped pieces in the form of unitary sets, with each X-shaped piece comprising two rods of equal length joined at their midpoints and extending between the foot piece and the head piece, the X-shaped pieces being connected at their ends to said foot piece and said head piece; and
   d) two connecting pieces connecting ends of said foot piece and said head piece with the second sector of the load frame.

2. The frame according to claim 1, wherein said web also comprises radial struts attached to the foot piece and to the head piece.

3. The frame according to claim 1, wherein said X-shaped pieces have a double T-shaped cross section.

4. The frame according to claim 1, wherein all said first sector is made of a composite material.

5. The frame according to claim 1, wherein said X-shaped pieces are joined to the foot piece and to the head piece by a mechanical joint.

6. The frame according to claim 4, wherein said X-shaped pieces are joined to the foot piece and to the head piece by a chemical bond.

7. The frame according to claim 6, wherein
   the head piece includes two C-shaped sub-pieces whose webs are attached to said X-shaped pieces; and
   the foot piece has a π-shape and two webs of the foot piece are joined to said X-shaped pieces.

8. The frame according to claim 7, wherein the foot piece further comprises transverse stiffeners of webs of the foot piece.

9. The frame according to claim 5, wherein said web comprises radial struts and wherein said X-shaped pieces and said struts are configured with a lug at each end to facilitate the joint to the foot piece and to the head piece.

10. The frame according to any of claim 5, wherein said X-shaped pieces are attached to webs of said foot piece and webs of said head piece by means of one or more joining elements.

11. The frame according to claim 10, wherein said foot piece has a T-shape with a stiffened web and said head piece has a C-shape.

12. The frame according to claim 10, wherein said foot piece has a T-shape, said head piece has an L-shape and said X-shaped pieces are arranged in two sets at both sides of the webs of said foot piece and said head piece, the X-shaped pieces being joined to the web of the foot piece by a joining element.

* * * * *